US010273934B2

(12) United States Patent
Jensen

(10) Patent No.: US 10,273,934 B2
(45) Date of Patent: Apr. 30, 2019

(54) WIND TURBINE, A WIND TURBINE BLADE, AND A METHOD OF REINFORCING A WIND TURBINE BLADE

(71) Applicant: BLADENA ApS, Ringsted (DK)

(72) Inventor: Find Mølholt Jensen, Viby Sjælland (DK)

(73) Assignee: BLADENA ApS, Ringsted (DK)

( * ) Notice: Subject to any disclaimer, the term of this patent is extended or adjusted under 35 U.S.C. 154(b) by 424 days.

(21) Appl. No.: 14/913,561

(22) PCT Filed: Aug. 20, 2014

(86) PCT No.: PCT/DK2014/050249
§ 371 (c)(1),
(2) Date: Feb. 22, 2016

(87) PCT Pub. No.: WO2015/024573
PCT Pub. Date: Feb. 26, 2015

(65) Prior Publication Data
US 2016/0201645 A1  Jul. 14, 2016

(30) Foreign Application Priority Data
Aug. 20, 2013 (DK) .................................. 2013 70454

(51) Int. Cl.
F03D 1/06 (2006.01)
B23P 6/00 (2006.01)
F03D 13/10 (2016.01)

(52) U.S. Cl.
CPC ............ F03D 1/0675 (2013.01); B23P 6/002 (2013.01); F03D 13/10 (2016.05); F05B 2260/30 (2013.01); Y02E 10/721 (2013.01)

(58) Field of Classification Search
CPC .................................................... F03D 1/0675
See application file for complete search history.

(56) References Cited

U.S. PATENT DOCUMENTS 7,118,338 B2 * 10/2006 Moroz .................. F03D 7/0228
416/1
7,988,416 B2 * 8/2011 Westergaard ......... F03D 1/0675
416/79
(Continued)

FOREIGN PATENT DOCUMENTS

DE   10 2009 040 515 A1   3/2011
EP         2 108 083 B1   11/2012
(Continued)

OTHER PUBLICATIONS

International Search Report dated Oct. 8, 2014 for PCT/DK2014/050249; Jensen.

Primary Examiner — Eldon T Brockman
(74) Attorney, Agent, or Firm — Lee & Morse, P.C.

(57) ABSTRACT

A wind turbine blade comprising a shell and at least a first girder wherein the first girder is connected to an upper part of the shell and a lower part of the shell, and where the wind turbine blade comprises at least one reinforcing member having a first end and a second opposite end. The reinforcing member comprises a first part with the first end and a second part with the second opposite end and that a length adjustment member is arranged between the first and the second part of the reinforcing member, and being adapted for mutually positioning and fixing the first and the second part in at least two different distances from each other.

16 Claims, 6 Drawing Sheets

(56) References Cited

U.S. PATENT DOCUMENTS

| | | | | |
|---|---|---|---|---|
| 8,192,169 B2* | 6/2012 | Piasecki | ................ | B23P 15/04 416/226 |
| 8,807,953 B2* | 8/2014 | Jensen | ................ | F03D 1/0675 416/226 |
| 8,863,382 B2* | 10/2014 | Piasecki | ................ | B23P 15/04 29/889.7 |
| 9,353,627 B2* | 5/2016 | Feigl | ................ | F03D 1/065 |
| 2006/0002794 A1* | 1/2006 | Moroz | ................ | F03D 7/0228 416/48 |
| 2010/0239426 A1* | 9/2010 | Westergaard | ........ | F03D 1/0675 416/226 |
| 2011/0171024 A1* | 7/2011 | Jensen | ................ | F03D 1/0675 416/1 |
| 2011/0182730 A1 | 7/2011 | Link | | |
| 2011/0187115 A1* | 8/2011 | Piasecki | ................ | B23P 15/04 290/55 |
| 2012/0174401 A1* | 7/2012 | Piasecki | ................ | B23P 15/04 29/889.71 |
| 2013/0209263 A1* | 8/2013 | Feigl | ................ | F03D 1/065 416/223 R |

FOREIGN PATENT DOCUMENTS

| | | |
|---|---|---|
| WO | WO 2008/089865 A2 | 7/2008 |
| WO | WO 2008/104174 A2 | 9/2008 |
| WO | WO 2009/155920 A1 | 12/2009 |

* cited by examiner

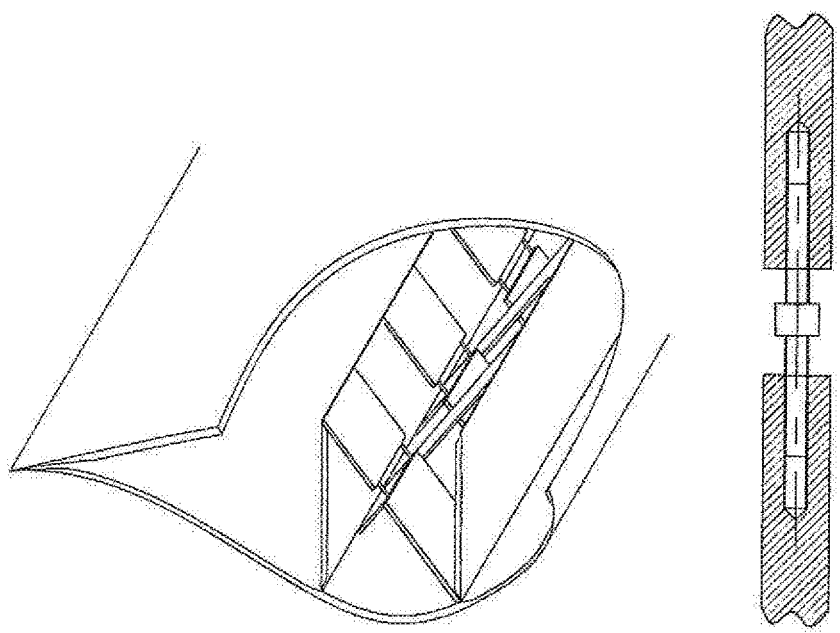
Fig. 10
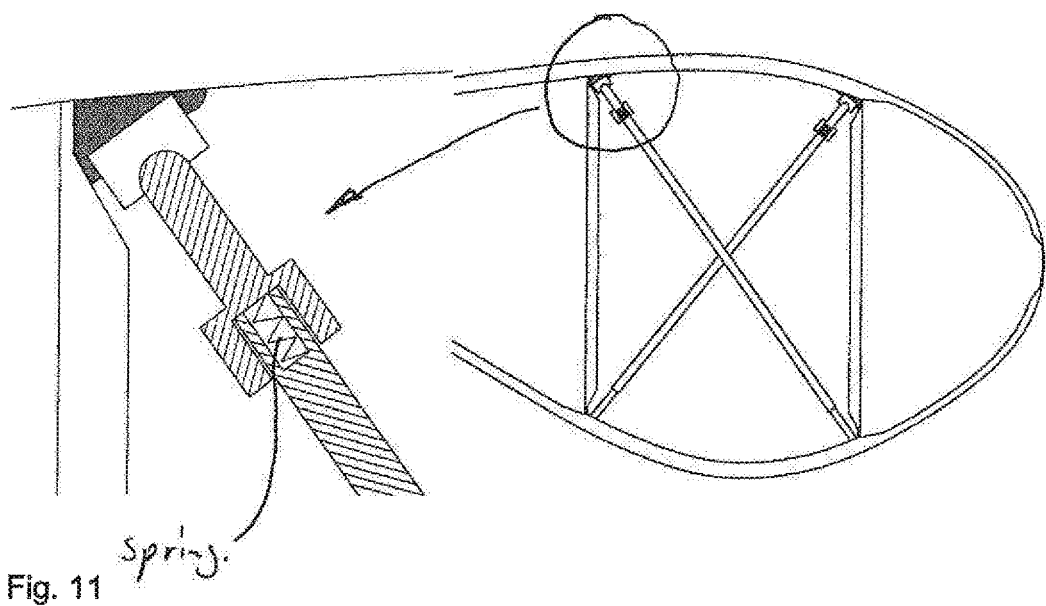
Fig. 11  spring.

US 10,273,934 B2

WIND TURBINE, A WIND TURBINE BLADE, AND A METHOD OF REINFORCING A WIND TURBINE BLADE

CROSS REFERENCE TO RELATED APPLICATIONS

This is the U.S. national phase application based on PCT Application No. PCT/DK2014/050249, filed Aug. 20, 2014, which is based on Denmark Patent Application No. DK20130070454, filed Aug. 20, 2013, the entire contents of all of which are hereby incorporated by reference.

1. THE PRIOR ART

The present invention relates to a method of inhibiting transverse shear distortion in a wind turbine blade having a shell and at least a first girder wherein the girder is connected to an upper part of the shell and a lower part of the shell, the method comprising the steps of, providing a reinforcing member having a first end and a second opposite end, and a first mounting position arranged on the first girder or on the upper part or the lower part of the shell relatively near the connection between the first girder and the shell, and a second mounting position arranged on the opposite part of the shell at a relatively longer distance from the first girder.

Furthermore the present invention relates to a wind turbine blade comprising at least one such reinforcing member, as well as a horizontal-axis wind turbine.

Typically a wind turbine blade has an aerodynamic shell and a girder, such as a beam or a spar. The girder can be a single beam, but often two or more girders are used forming the beam extending along the length of the wind turbine blade.

EP patent no. 2108083B1 discloses a wind turbine blade of this kind, having one or more reinforcing members built into the wing in order to reduce transverse shear distortion of the blade when the wind turbine blade is harvesting energy from the wind.

2. THE OBJECT OF THE INVENTION

On this background it is the purpose of the present invention to provide a method of retrofitting a wind turbine blade with reinforcing devices in order to inhibit transverse shear distortion of a wind turbine blade, and especially a wind turbine blade for a horizontal-axis wind turbine.

This is obtained by the method described in the introduction and further comprising the steps applying a load on the wind turbine blade in order to create an elastic deformation of the wind turbine blade in such a way that the distance between the first and the second mounting position are increased or reduced, and thereafter positioning the first end and the second end of the reinforcing member in front of the first and the second mounting position respectively, and then relieving the load on the wind turbine blade, and/or by first positioning the first and the second end of the reinforcing member next to the first and the second mounting position respectively and thereafter increasing the distance between first and the second opposite end of the reinforcing member, so that the first and second end of the reinforcing member abuts the first and the second mounting position respectively on the wind turbine blade, or by first fastening the first and the second opposite end of the reinforcing member to the first and the second mounting position respectively, and thereafter reducing the distance between first and the second opposite end of the reinforcing member.

In a preferred embodiment the wind turbine blade has a mounting flange arranged at one end of the wind turbine blade, and the wind turbine blade is mounted on a fixed supporting structure and extends away from the supporting structure in such a way that the gravity influence on the blade completely or partly provides said load on the wind turbine blade In this relation the supporting structure may preferably comprise the hub of a substantially horizontal axis wind turbine, and the hub being fixed in a position where the wind turbine blade at least partly extends in a horizontal direction away from the hub.

Furthermore the load on the wind turbine blade may preferably be provided by applying a pushing or pulling force on at least part of the wind turbine blade, in addition to the gravitational force.

In a further preferred embodiment the reinforcing member comprises an elastic member, such as a spring, arranged between the first and the second opposite end, and the reduction and increase of the distance between the first and the second opposite end of the reinforcement member is obtained respectively by compressing and relieving the elastic member.

In this relation the reinforcing member may preferably comprise a damper arranged so that it dampens the movement of the elastic member.

Furthermore the reinforcing member may comprise a first part comprising the first end and a second part comprising the second opposite end, and where the first and the second part are mutually connected to each other via a length adjustment member adapted for selectively positioning and fixing the first and second part in at least two different positions, so that the reduction and increase of the distance between the first and the second opposite end of the reinforcement member may be obtained by positioning and fixing the first and the second part in one of the at least two different positions.

The present invention also relates to a wind turbine blade comprising a shell and at least a first girder wherein the first girder is connected to an upper part of the shell and a lower part of the shell, and where the wind turbine blade comprises a reinforcing member having a first end and a second opposite end, and where a first mounting position is arranged on the first girder or on the upper part or the lower part of the shell relatively near the connection between the first girder and the shell, and a second mounting position is arranged on the opposite part of the shell at a relatively longer distance from the first girder, and where the first and the second mounting position are arranged on a line of adjustment, and the first and the second end of the reinforcing member abuts the first and the second mounting position respectively on the wind turbine blade. According to the invention the reinforcing member comprises a first part with the first end and a second part with the second opposite end and that a length adjustment member is arranged between the first and the second part of the reinforcing member, and being adapted for mutually positioning and fixing the first and the second part in at least two different distances from each other along the line of adjustment.

In a preferred embodiment of the wind turbine blade the length adjustment member comprises a screw having a right handed thread extending in one direction along the line of adjustment and into a compatible thread arranged in the first part of the reinforcing member, and a left handed thread extending in the opposite direction and into the second part of the reinforcing member.

In this relation at least one of the first or the second part of the reinforcing member may preferably comprise an elastic member, such as a spring, adapted for allowing the at least one of the first or the second part of the reinforcing member to be compressed along the line of adjustment, and against the force of the elastic member, and the at least one of the first or the second part of the reinforcing member in a further preferred embodiment comprise a damper arranged in parallel to the elastic member, and being adapted for damping movement of the elastic member.

In an especially simple embodiment the reinforcing member comprises a substantially straight rod extending between the first and the second end.

In this relation the first and/or the second mounting position may preferably comprise a socket adapted for releasably receiving the first or the second opposite end of the reinforcing member.

Furthermore the socket and the first or the second end abutting the socket may advantageously be formed so as to allow the reinforcing member to rotate freely at least around an axis of rotation extending along the length of the wind turbine blade.

The socket may preferably be mounted to the girder and/or the shell with an adhesive.

THE DRAWING

In the following one or more embodiments of the invention will be described in more detail and with reference to the drawing, where:

FIG. 1: Is a principle drawing showing an undeformed blade cross-section (in solid line) and a shear distorted blade during operation (in dashed line).

FIG. 2: Is a principle drawing showing two reinforcement members installed crossing each other between two girders (shear webs) of the wind turbine blade.

FIG. 3: Is a principle drawing, showing a section of a wind turbine blade as shown in FIG. 2 and having more sets of reinforcement members installed crossing each other between two girders (shear webs) of the wind turbine blade.

FIG. 4 is a principle drawing, showing a detail in the form of the connection area between the reinforcement member and the girder in the wind turbine blade shown in FIGS. 2 and 3.

FIG. 5: Is a principle drawing, showing how the gravitational forces causes the blade to shear distort in opposite direction dependent on the blade position on a horizontal-axis wind turbine.

FIG. 6: Is a principle drawing showing how one reinforcing member can be installed when the blade is in a shear distorted position.

FIG. 7: Is a principle drawing, showing two reinforcement members installed on a wind turbine blade with one shear web.

FIG. 8: Is a principle drawing, showing a horizontal-axis wind turbine having one wind turbine blade placed in position for installation of the reinforcing member as shown in FIG. 6.

FIG. 9: Is a principle drawing, showing an alternative embodiment of the reinforcing member, each being in the form of a plate shaped element.

FIG. 10: Is a principle drawing, showing an alternative embodiment of the reinforcing member. Each in the form of a plate element with two parts being connected via an extension screw.

FIG. 11: Is a principle drawing, showing a cross section of a blade equipped with an alternative embodiment of a reinforcing member, and a detail of one end of the reinforcing member.

FIG. 12: Is a principle drawing, showing a cross section of a blade equipped with an alternative embodiment of the invention.

FIG. 13: Is a principle drawing, showing a cross section of a blade equipped with a further alternative embodiment of the invention.

DESCRIPTION OF EXEMPLARY EMBODIMENTS

FIG. 1 shows an undeformed blade cross-section (in solid line) and a shear distorted blade during operation (in dashed line).

FIG. 2 shows two reinforcing members installed crossing each other between the shear webs on wind turbine blade. The reinforcing members are installed so that they are in compression when installed and when the wind turbine is in operation. The desired pre-compression is obtained by an extension mechanism (1) e.g. a threaded rod. Each reinforcing member is equipped with a spring-damper system (2). The spring ensures that the stiffener always is in compression even if the cross-section is shear distorted. The spring can also be configured to be fully compressed (do not allow any movement if the compressive force increases) for the desired pre-compression. If the cross-section is shear distorted is the movement damped by the damper e.g. viscous damping. The damper can be configured to be damping the motion in either both directions or only one-way.

FIG. 3 shows the same embodiment as in FIG. 2, but with more sets of reinforcing members arranged along the length of the turbine blade.

FIG. 4 shows a socket (1) which allows some rotational freedom in the connection between the stiffening member (3) and socket is installed to the girder (shear web/load carrying spar) or in the corner between the girder and the shell. The socket can be installed by use of e.g. adhesive (2) so the area of attachment is covering a large area and stress concentrations are reduced. The socket is installed in all four corners. The reinforcing member (3) has ends which mate with the sockets. The ends are mounted in two sockets located in opposite corners and pre-compression can be applied.

FIG. 5 shows that the reinforcing member can be installed when the blade is in a shear distorted position. The first of the reinforcing members is installed in the distorted position, after installation the blade is released from the position and the member is in compression, In FIG. 6 the second reinforcing member is installed when the blade is distorted in the opposite direction. Both of the reinforcing members are then under compression. The reinforcing members can also be equipped with an extension mechanism/system in order to adjust the length to the specific blade cross-section, and hence obtain a desired compression of the stiffeners. The reinforcing members can additionally be equipped with a spring-damper system. The shear distorted position need for installation can be obtained by the gravitational forces and positioning the blade at a certain pitch angle, see FIG. 5. External force can also be applied to the blade causing the blade to deflect and shear distort.

In figure FIG. 7 two reinforcing members are installed on a blade with one girder (shear web). The reinforcing members (1) are attached to each side of the girder on the suction side in the corner between the spar and girder. On the spar on the pressure side (2) are the stiffeners attached to the spar near the edges towards the sandwich panels. The reinforcing members can be installed by using the extension mechanism as well as the socket attachment mentioned above or be installed when the blade is in a distorted position. The spring-damper system can also be implemented.

FIG. 8 shows that the reinforcing members can be installed by a technician when the blade is parked in a horizontal position, as shown in FIG. 8. The technician will enter the root of the blade through the nacelle, where the area between the shear webs is accessible for the entire length of the blade. Between the shear webs there is room for the technician to move to the position where the reinforcing member is to be installed. There is room to bring tools needed for preparation and gluing of the sockets and installation and pre-compression of the reinforcing members.

FIGS. 9 and 10 shows embodiments of the reinforcing each comprising a plate and means for adjusting the length of the plate.

FIG. 11 shows am embodiment of the reinforcing members ensuring that the reinforcing member also is in compression if the blade shear distort. The two parts are in contact when the blade is not shear distorted, but if distorted then the compressed spring keeps the reinforcing member in compression.

Figure 12:
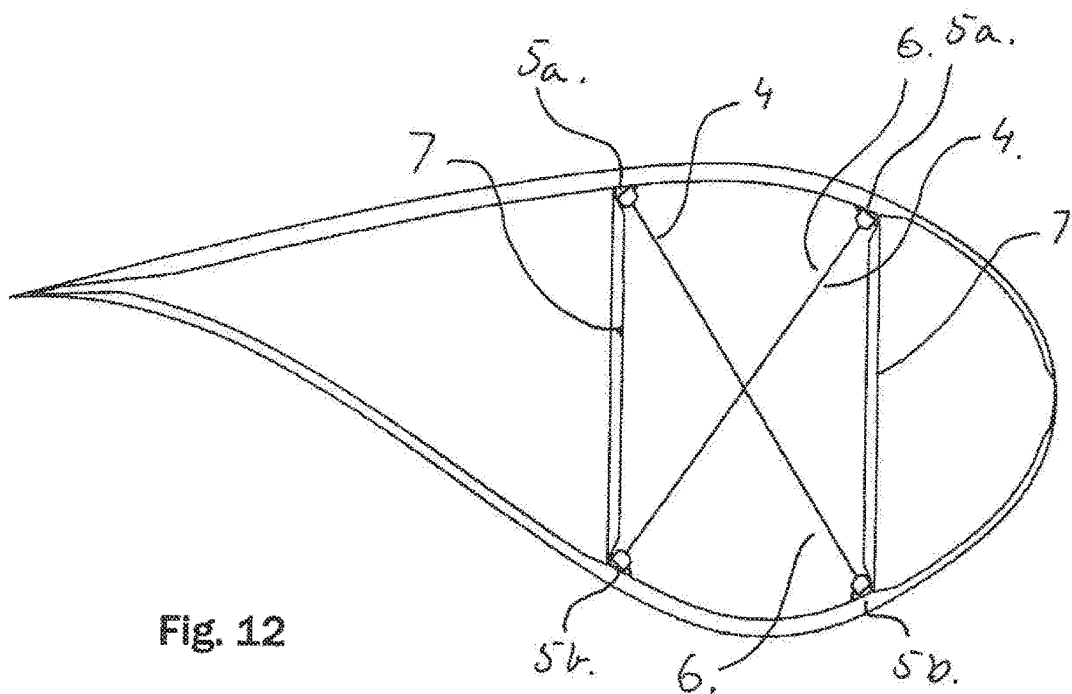

FIG. 12 shows an embodiment where each of the reinforcing members (6) comprises a wire, a string or the like (4) extending between a first mounting position (5a) near one girder (7) and another mounting position (5b) at a distance from the same girder (7). The wire (4) is fastened to the mounting positions (5a, 5b). This embodiment is mounted in the blade by first applying a load on the blade, so that the distance between the two mounting positions (5a, 5b) is reduced so that it is the same as, or less than the total length of the reinforcing member. In this position the respective ends of the reinforcing member is fastened to the two mounting positions (5a, 5b) and the load on the blade is thereafter released, so that the reinforcing members is tensioned.

Figure 13:
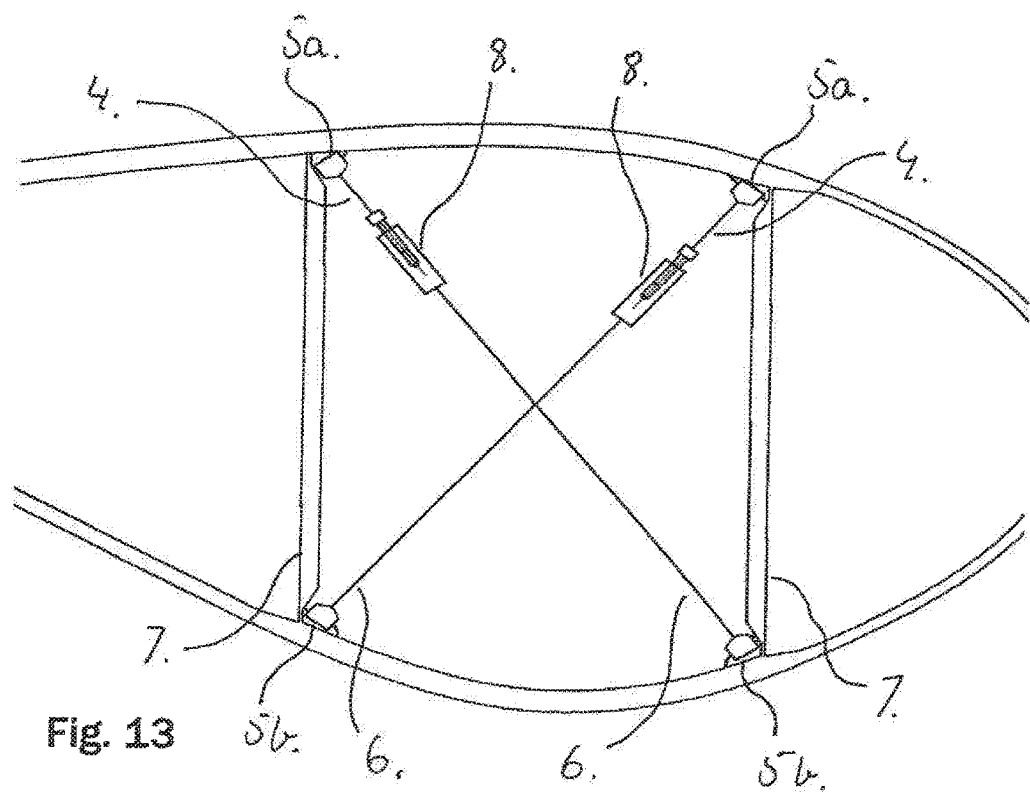

FIG. 13 shows a further alternative embodiment of the invention, where each of the reinforcing members (6) comprises a wire, a string or the like (4) extending between a first mounting position (5a) near one girder (7) and another mounting position (5b) at a distance from the same girder (7). The wire (4) is fastened to the mounting positions (5a, 5b), This embodiment is mounted in the blade by first adjusting the length of the reinforcing member, using the length adjustment mechanism (8) comprising a screw and a nut, so that it corresponds to the distance between the first and second mounting positions (5a, 5b), and thereafter tensioning the reinforcing member by reducing the length of the reinforcing member, using the length adjustment mechanism (8).

Figure 1:
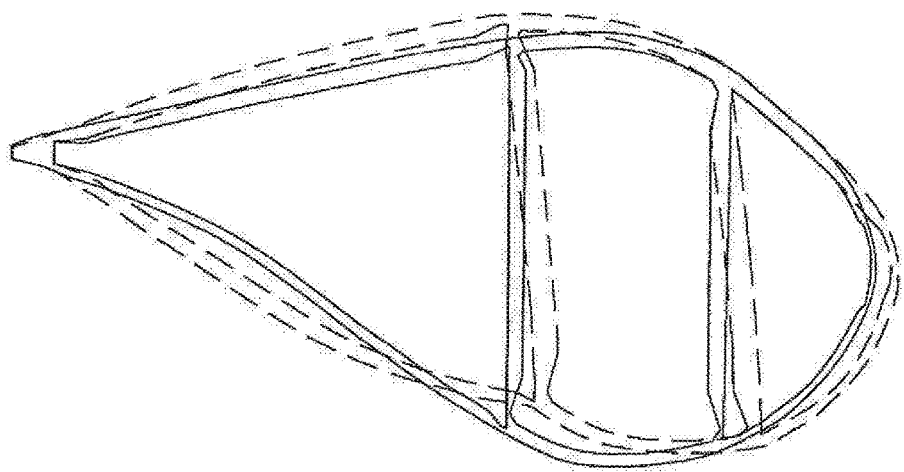
Figure 2:
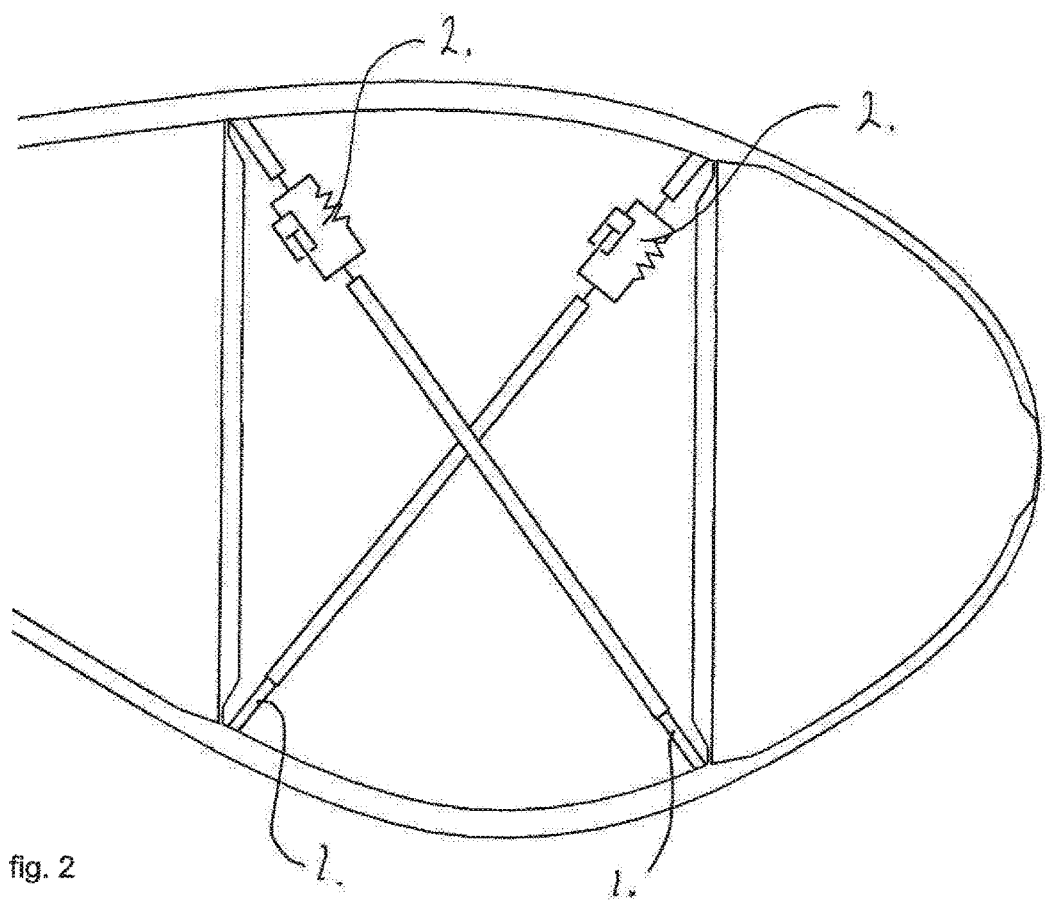
Figure 3:
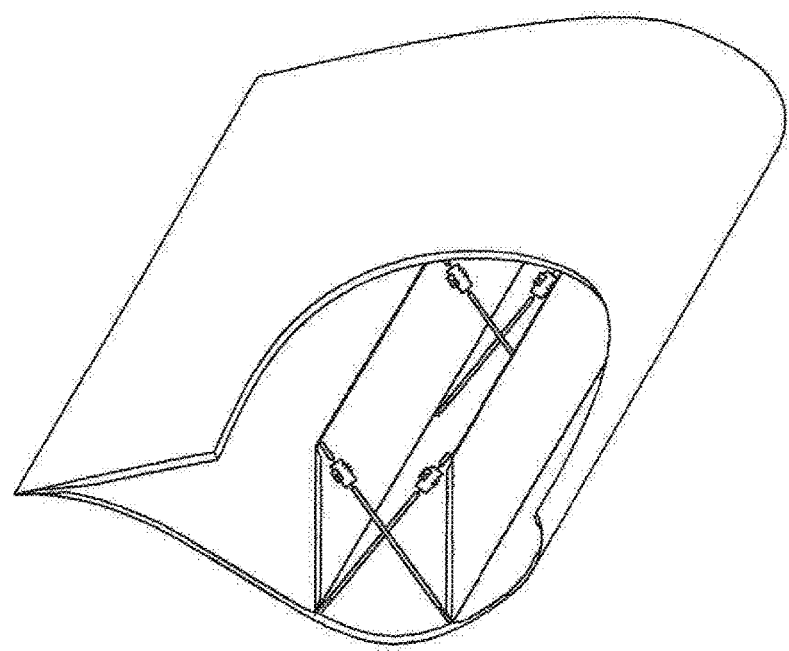
Figure 4:
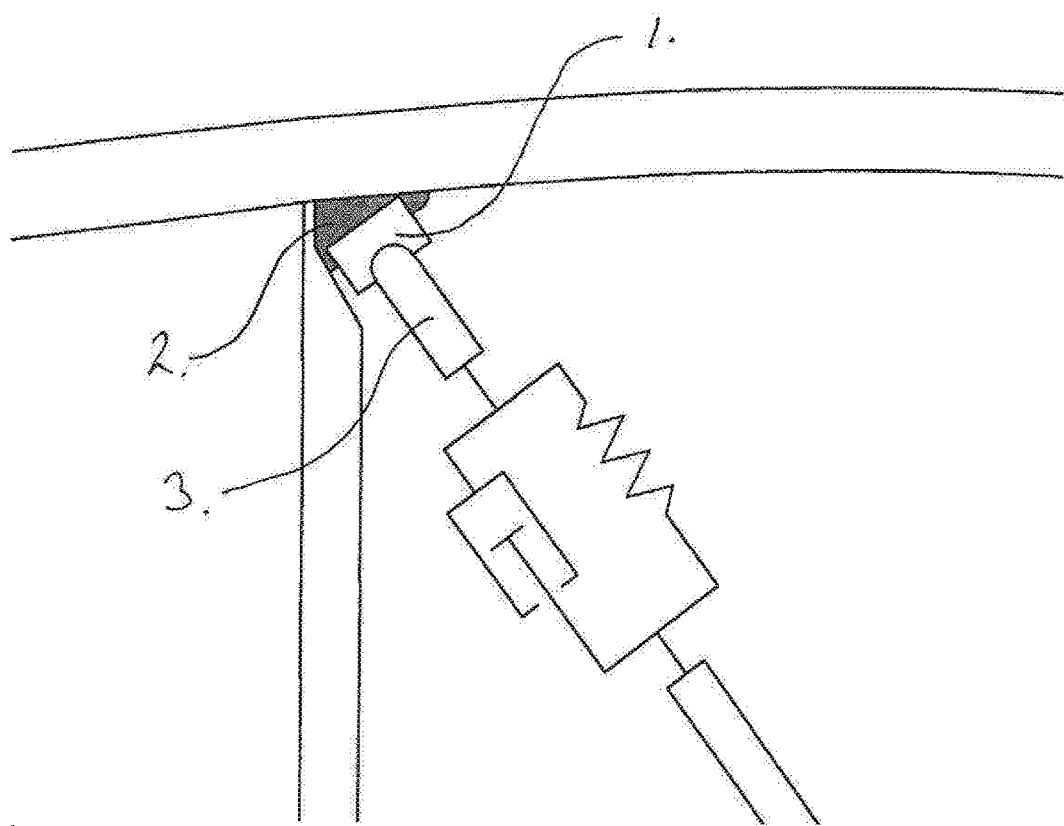
Figure 5:
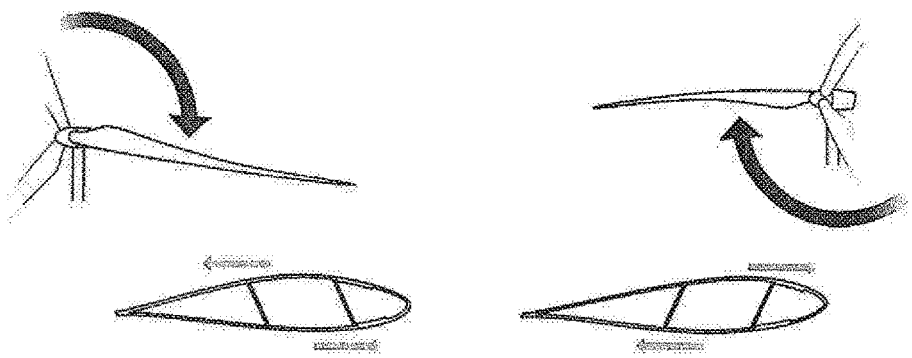
Figure 6:
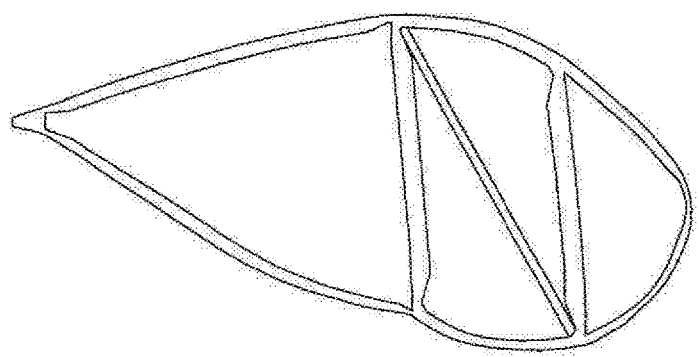
Figure 7:
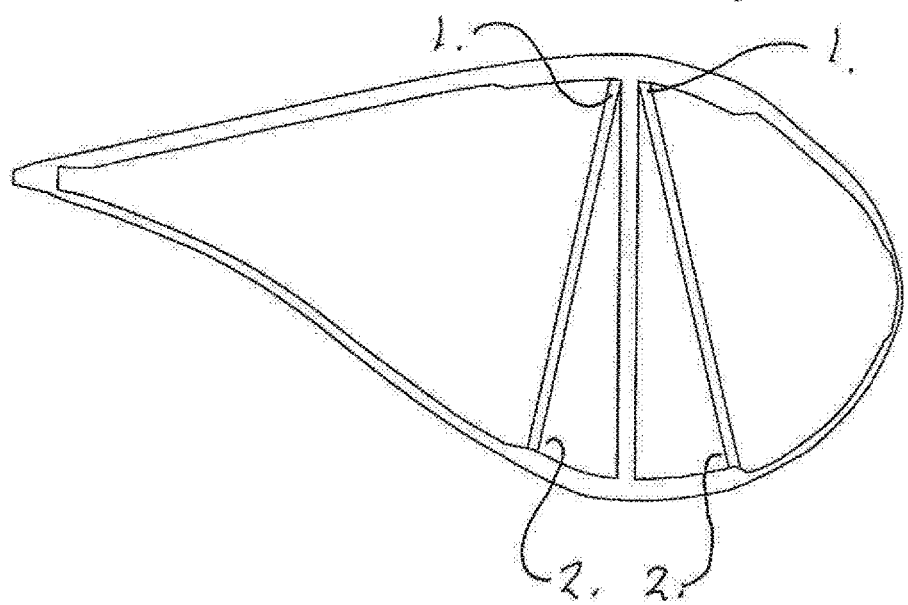
Figure 8:
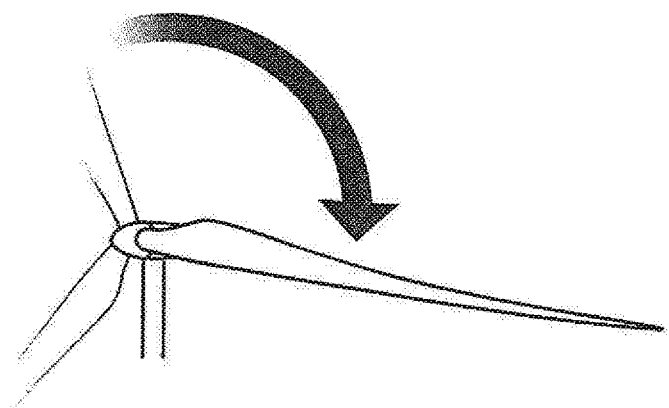
Figure 9:
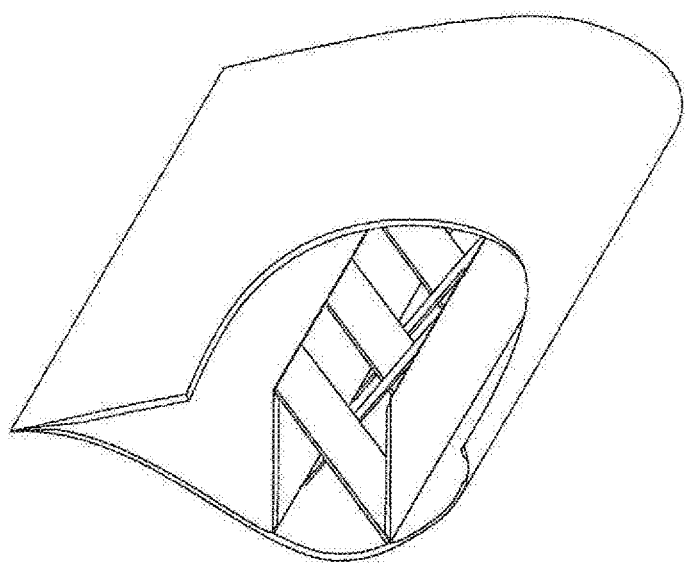

According to the invention the embodiments of the reinforcing members shown on FIGS. 12 and 13 may also be equipped with a damper and/or a spring such as shown on FIGS. 2, 3 and 4, and for the same purpose.

The invention claimed is:

1. A method of inhibiting transverse shear distortion in a wind turbine blade having a shell and at least a first girder wherein the girder is connected to an upper part of the shell and a lower part of the shell, the method comprising:
providing a reinforcing member having a first end and a second end, opposite the first end, and a first mounting position arranged on the first girder or on the upper part or the lower part of the shell near a connection between the first girder and the shell, and a second mounting position arranged on the opposite part of the shell further from the first girder than the first mounting position,
applying a load on the wind turbine blade in order to create an elastic deformation of the wind turbine blade such that a distance between the first and second mounting positions is increased or reduced,
positioning the first end and the second end of the reinforcing member in front of the first and second mounting positions respectively to the wind turbine blade having the elastic deformation,
relieving the load on the wind turbine blade, and/or by first positioning the first and second ends of the reinforcing member next to the first and second mounting positions respectively,
increasing the distance between the first and second opposite ends of the reinforcing member, so that the first and second ends of the reinforcing member abuts the first and second mounting positions respectively on the wind turbine blade, or by first fastening the first and second ends of the reinforcing member to the first and second mounting positions respectively, and
reducing the distance between the first and second ends of the reinforcing member.

2. A method according to claim 1, wherein the wind turbine blade has a mounting flange arranged at one end of the wind turbine blade, and where the wind turbine blade is mounted on a fixed supporting structure and extends away from the fixed supporting structure in such a way that the gravity influence on the wing completely or partly provides said load on the wind turbine blade.

3. A method according to claim 2, wherein the fixed supporting structure includes a hub of a substantially horizontal axis wind turbine, and where the hub is fixed in a position where the wind turbine blade at least partly extends in a horizontal direction away from the hub.

4. A method according to claim 2, wherein said load on the wind turbine blade is provided by applying a pushing or pulling force on at least part of the wind turbine blade, in addition to the gravitational force.

5. A method according to claim 1, wherein the reinforcing member includes an elastic member between the first and second ends, and where reduction and increase of the distance between the first and second ends of the reinforcing member is obtained respectively by compressing and relieving the elastic member.

6. A method according to claim 5, wherein the reinforcing member includes a damper that dampens the movement of the elastic member.

7. A method according to claim 5, wherein the reinforcing member includes a first part including the first end and a second part including the second end, and where the first and second parts are mutually connected to each other via a screw for selectively positioning and fixing the first and second parts in at least two different positions, wherein the screw has a right handed thread extending in one direction along a line of adjustment, along which the first and second mounting positions are arranged, and into a compatible thread arranged in the first part of the reinforcing member, and a left handed thread extending in the opposite direction and into the second part of the reinforcing member, and where reduction and increase of the distance between the first and second ends of the reinforcing member is obtained by positioning and fixing the first and second parts in one of the at least two different positions.

8. A wind turbine blade, comprising:
a shell;
at least a first girder, wherein the first girder is connected to an upper part of the shell and a lower part of the shell;
a reinforcing member having a first end and a second end, opposite the first end;
a first mounting position is arranged on the first girder or on the upper part or the lower part of the shell near a connection between the first girder and the shell;
a second mounting position is arranged on the opposite part of the shell further from the first girder than the first mounting position, wherein
the first and second mounting positions are arranged on a line of adjustment,
the first and second ends of the reinforcing member abuts the first and second mounting positions respectively on the wind turbine blade,
the reinforcing member includes a first part with the first end and a second part with the second end, wherein at least one of the first or the second parts of the reinforcing member includes an elastic member that allows the at least one of the first or the second parts of the reinforcing member to be compressed along the line of adjustment, and against the force of the elastic member; and
a screw between the first and second parts of the reinforcing member, the screw mutually positioning and fixing the first and second parts in at least two different distances from each other along the line of adjustment, wherein the screw has a right handed thread extending in one direction along the line of adjustment and into a compatible thread arranged in the first part of the reinforcing member, and a left handed thread extending in the opposite direction and into the second part of the reinforcing member.

9. A wind turbine blade according to claim 8, wherein the at least one of the first or second parts of the reinforcing member includes a damper arranged in parallel to the elastic member to damp movement of the elastic member.

10. A wind turbine according to claim 8, wherein the reinforcing member includes a substantially straight rod extending between the first and the second end.

11. A wind turbine according to claim 8, wherein the reinforcing member includes a wire or a string extending between the first and the second end.

12. A wind turbine blade according to claim 10, wherein the first and/or second mounting positions includes a socket to releasably receive the first and/or the second end of the reinforcing member.

13. A wind turbine blade according to claim 12, wherein the socket and the first or second end abutting the socket allow the reinforcing member to rotate freely along an axis of rotation extending along the length of the wind turbine blade.

14. A wind turbine blade according to claim 12, wherein the socket is mounted to the girder and/or the shell with an adhesive.

15. A horizontal-axis wind turbine comprising a wind turbine blade according to claim 8.

16. A wind turbine blade according to claim 8, further comprising a mounting flange arranged at one end, wherein the wind turbine blade is to be mounted on a fixed supporting structure and extends away from the fixed supporting structure in such a way that the gravity influence on the wing completely or partly provides said load on the wind turbine blade.

* * * * *